United States Patent
Shinoda et al.

(10) Patent No.: US 11,235,780 B2
(45) Date of Patent: Feb. 1, 2022

(54) ELECTRONIC CONTROL DEVICE, IN-VEHICLE SYSTEM, AND POWER SUPPLY CONTROL METHOD

(71) Applicant: HITACHI AUTOMOTIVE SYSTEMS, LTD., Ibaraki (JP)

(72) Inventors: Hiroshi Shinoda, Tokyo (JP); Ming Liu, Tokyo (JP); Taisuke Ueta, Tokyo (JP); Hideyuki Sakamoto, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 419 days.

(21) Appl. No.: 16/463,284

(22) PCT Filed: Sep. 12, 2017

(86) PCT No.: PCT/JP2017/032772
§ 371 (c)(1),
(2) Date: May 22, 2019

(87) PCT Pub. No.: WO2018/096767
PCT Pub. Date: May 31, 2018

(65) Prior Publication Data
US 2019/0308637 A1    Oct. 10, 2019

(30) Foreign Application Priority Data

Nov. 28, 2016 (JP) .............................. JP2016-230386

(51) Int. Cl.
*B60W 50/06* (2006.01)
*B60R 16/02* (2006.01)
(Continued)

(52) U.S. Cl.
CPC ............. *B60W 50/06* (2013.01); *B60R 16/02* (2013.01); *B60W 30/182* (2013.01);
(Continued)

(58) Field of Classification Search
CPC .... B60W 50/06; B60W 30/182; B60W 50/04; B60R 16/02; F02D 45/00; G05F 1/46; G06F 1/26; H02M 3/155
See application file for complete search history.

(56) References Cited

U.S. PATENT DOCUMENTS 9,368,936 B1 * 6/2016 Lenius ..................... G01S 17/10
9,665,101 B1 * 5/2017 Templeton ........... G05D 1/0272
(Continued)

FOREIGN PATENT DOCUMENTS

JP    2004-336986 A    11/2004
JP    2006-060918 A    3/2006
(Continued)

OTHER PUBLICATIONS

International Search Report for PCT/JP2017/032772, dated Dec. 19, 2017.

*Primary Examiner* — Yazan A Soofi
*Assistant Examiner* — Naeem Taslim Alam
(74) *Attorney, Agent, or Firm* — Volpe Koenig

(57) ABSTRACT

A transient increase/decrease of power supplied to a reconfiguration circuit to be a logic circuit whose circuit configuration can be changed is reduced. An autonomous traveling control ECU has a reconfiguration circuit, a function control unit, a power supply circuit, and a power supply control unit. The reconfiguration circuit is a reconfigurable logic circuit. The function control unit determines an operation mode of the reconfiguration circuit on the basis of a mode determination signal and controls a reconfiguration of the reconfiguration circuit on the basis of a determination result. The power supply circuit supplies power to the reconfiguration circuit. The power supply control unit controls the power supply circuit. The power supply control unit 206 controls a load current generated by the power supply circuit before a load variation of the reconfiguration circuit, on the basis of
(Continued)

power supply control information to be information for controlling the power supply circuit.

14 Claims, 12 Drawing Sheets

(51) Int. Cl.
    *B60W 30/182* (2020.01)
    *G05F 1/46* (2006.01)
    *G06F 1/26* (2006.01)
    *B60W 50/04* (2006.01)
    *F02D 45/00* (2006.01)
    *H02M 3/155* (2006.01)

(52) U.S. Cl.
    CPC ............. *B60W 50/04* (2013.01); *F02D 45/00* (2013.01); *G05F 1/46* (2013.01); *G06F 1/26* (2013.01); *H02M 3/155* (2013.01)

(56) References Cited

U.S. PATENT DOCUMENTS

| | | | |
|---|---|---|---|
| 9,802,661 B1* | 10/2017 | Kentley-Klay | B61L 15/0018 |
| 9,946,531 B1* | 4/2018 | Fields | B60W 40/08 |
| 2004/0221182 A1 | 11/2004 | He et al. | |
| 2005/0078002 A1* | 4/2005 | Okubo | B60C 23/0408 |
| | | | 340/445 |
| 2010/0117585 A1* | 5/2010 | Fitch | B25J 19/06 |
| | | | 318/568.12 |
| 2011/0109281 A1 | 5/2011 | Yabuzaki et al. | |
| 2015/0224947 A1* | 8/2015 | Kim | B60R 16/033 |
| | | | 307/10.1 |
| 2016/0114695 A1* | 4/2016 | Holgers | B60L 3/0046 |
| | | | 701/22 |
| 2016/0161367 A1* | 6/2016 | Chu | G01M 15/02 |
| | | | 324/433 |
| 2017/0066436 A1* | 3/2017 | Endo | B60W 20/19 |
| 2017/0072812 A1* | 3/2017 | Von Novak | H02J 1/10 |
| 2017/0123421 A1* | 5/2017 | Kentley | G06Q 10/00 |
| 2017/0136842 A1* | 5/2017 | Anderson | B60G 17/019 |
| 2017/0183007 A1* | 6/2017 | Oh | B60W 50/14 |
| 2017/0235305 A1* | 8/2017 | Jung | B60W 50/082 |
| | | | 701/23 |
| 2017/0247041 A1* | 8/2017 | Kim | B60W 50/14 |
| 2017/0364629 A1* | 12/2017 | Tarte | G16Z 99/00 |
| 2018/0037154 A1* | 2/2018 | Dudar | B60Q 1/143 |
| 2018/0081360 A1* | 3/2018 | Bostick | G06Q 10/04 |
| 2018/0279105 A1* | 9/2018 | Huber | B64C 39/024 |
| 2019/0101935 A1* | 4/2019 | Lai | B64C 39/024 |
| 2019/0135133 A1* | 5/2019 | Miller | B60L 53/16 |
| 2019/0138019 A1* | 5/2019 | Hayashi | G05D 1/0088 |
| 2019/0286162 A1* | 9/2019 | Fischer | G08G 1/22 |
| 2020/0269780 A1* | 8/2020 | Kaneda | H01H 9/54 |

FOREIGN PATENT DOCUMENTS

| | | |
|---|---|---|
| JP | 2010-151619 A | 7/2010 |
| JP | 2010-282563 A | 12/2010 |
| JP | 2011-103725 A | 5/2011 |
| JP | 2014-046748 A | 3/2014 |
| JP | 2014-137797 A | 7/2014 |
| WO | 2016/080452 A1 | 5/2016 |

* cited by examiner

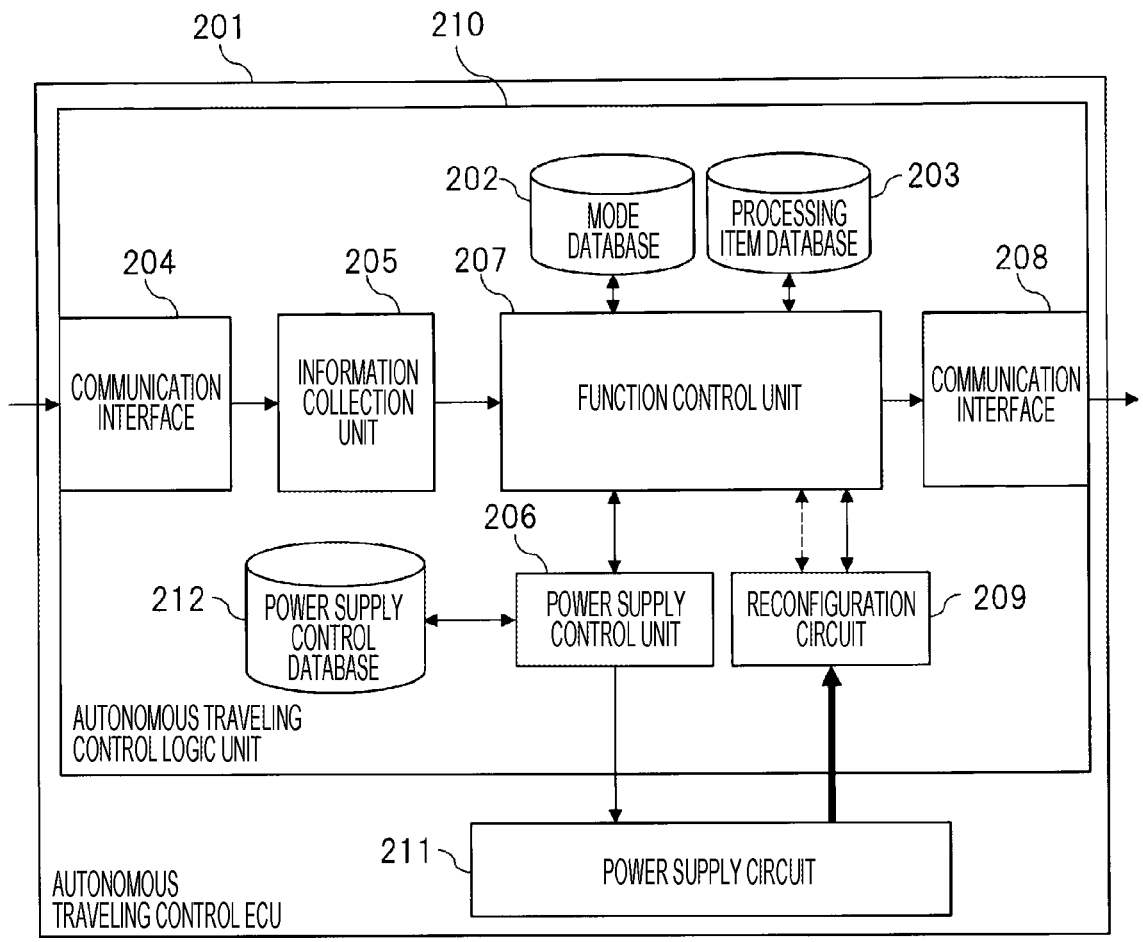

FIG. 4

| OPERATION MODE | PROCESSING METHOD | PROCESSING INFORMATION 1 | PROCESSING INFORMATION 2 | PROCESSING INFORMATION 3 |
|---|---|---|---|---|
| MODE 1 | SEQUENTIALLY EXECUTE RESPECTIVE PROCESSING OF PROCESSING INFORMATION 1, PROCESSING INFORMATION 2, AND PROCESSING INFORMATION 3 ON ONE CIRCUIT REGION | CIRCUIT: A1<br>TIME: T11 | CIRCUIT: A2<br>TIME: T12 | CIRCUIT: A3<br>TIME: T13 |
| MODE 2 | DIVIDE CIRCUIT REGION INTO TWO PARTS, SEQUENTIALLY EXECUTE PROCESSING OF PROCESSING INFORMATION 1 AND PROCESSING INFORMATION 2 IN ONE REGION, AND EXECUTE PROCESSING OF PROCESSING INFORMATION 3 IN OTHER REGION | CIRCUIT: B1<br>TIME: T21 | CIRCUIT: B2<br>TIME: T22 | CIRCUIT: B3<br>TIME: T23 |
| MODE 3 | DIVIDE CIRCUIT REGION INTO THREE PARTS AND EXECUTE RESPECTIVE PROCESSING OF PROCESSING INFORMATION 1, PROCESSING INFORMATION 2, AND PROCESSING INFORMATION 3 IN PARALLEL | CIRCUIT: C1<br>TIME: T31 | CIRCUIT: C2<br>TIME: T32 | CIRCUIT: C3<br>TIME: T33 |
| .... | .... | .... | .... | .... |

| OPERATION MODE | CONTROL INFORMATION 0 | CONTROL INFORMATION 1 | CONTROL INFORMATION 2 | CONTROL INFORMATION 3 | CONTROL INFORMATION 4 | CONTROL INFORMATION 5 | CONTROL INFORMATION 6 |
|---|---|---|---|---|---|---|---|
| MODE 1 | (IF RECONFIGURATION) TIMER: TA0 CURRENT: IA0 TIME: PA0 | (A1 RECONFIGURATION) TIMER: TA1 CURRENT: IA1 TIME: PA1 | (FIRST PROCESSING) TIMER: TA2 CURRENT: IA2 TIME: PA2 | (A2 RECONFIGURATION) TIMER: TA3 CURRENT: IA3 TIME: PA3 | (SECOND PROCESSING) TIMER: TA4 CURRENT: IA4 TIME: PA4 | (A3 RECONFIGURATION) TIMER: TA5 CURRENT: IA5 TIME: PA5 | (THIRD PROCESSING) TIMER: TA6 CURRENT: IA6 TIME: PA6 |
| MODE 2 | TIMER: TB0 CURRENT: IB0 TIME: PB0 | TIMER: TB1 CURRENT: IB1 TIME: PB1 | TIMER: TB2 CURRENT: IB2 TIME: PB2 | TIMER: TB3 CURRENT: IB3 TIME: PB3 | TIMER: TB4 CURRENT: IB4 TIME: PB4 | TIMER: TB5 CURRENT: IB5 TIME: PB5 | TIMER: TB6 CURRENT: IB6 TIME: PB6 |
| MODE 3 | TIMER: TC0 CURRENT: IC0 TIME: PC0 | TIMER: TC1 CURRENT: IC1 TIME: PC1 | TIMER: TC2 CURRENT: IC2 TIME: PC2 | TIMER: TC3 CURRENT: IC3 TIME: PC3 | TIMER: TC4 CURRENT: IC4 TIME: PC4 | TIMER: TC6 CURRENT: IC6 TIME: PC6 | TIMER: TC6 CURRENT: IC6 TIME: PC6 |
| ..... | | | | | | | |

FIG. 12

| OPERATION MODE | CONTROL INFORMATION 0 | CONTROL INFORMATION 1 | CONTROL INFORMATION 2 | CONTROL INFORMATION 3 | CONTROL INFORMATION 4 | CONTROL INFORMATION 5 | CONTROL INFORMATION 6 | |
|---|---|---|---|---|---|---|---|---|
| MODE 1 | (IF RECONFIGURATION) TIMER: TA01 VOLTAGE: VA01 TIME: PA01 TIMER: TA02 VOLTAGE: VA02 TIME: PA02 | (A1 RECONFIGURATION) TIMER: TA11 VOLTAGE: VA11 TIME: PA11 TIMER: TA12 VOLTAGE: VA12 TIME: PA12 | (FIRST PROCESSING) TIMER: TA21 VOLTAGE: VA21 TIME: PA21 TIMER: TA22 VOLTAGE: VA22 TIME: PA22 | (A2 RECONFIGURATION) TIMER: TA31 VOLTAGE: VA31 TIME: PA31 TIMER: TA32 VOLTAGE: VA32 TIME: PA32 | (SECOND PROCESSING) TIMER: TA41 VOLTAGE: VA41 TIME: PA41 TIMER: TA42 VOLTAGE: VA42 TIME: PA42 | (A3 RECONFIGURATION) TIMER: TA51 VOLTAGE: VA51 TIME: PA51 TIMER: TA52 VOLTAGE: VA52 TIME: PA52 | (THIRD PROCESSING) TIMER: TA61 VOLTAGE: VA61 TIME: PA61 TIMER: TA62 VOLTAGE: VA62 TIME: PA62 | .... |
| MODE 2 | TIMER: TB01 VOLTAGE: VB01 TIME: PB01 TIMER: TB02 VOLTAGE: VB02 TIME: PB02 | TIMER: TB11 VOLTAGE: VB11 TIME: PB11 TIMER: TB12 VOLTAGE: VB12 TIME: PB12 | TIMER: TB21 VOLTAGE: VB21 TIME: PB21 TIMER: TB22 VOLTAGE: VB22 TIME: PB22 | TIMER: TB31 VOLTAGE: VB31 TIME: PB31 TIMER: TB32 VOLTAGE: VB32 TIME: PB32 | TIMER: TB41 VOLTAGE: VB41 TIME: PB41 TIMER: TB42 VOLTAGE: VB42 TIME: PB42 | TIMER: TB51 VOLTAGE: VB51 TIME: PB51 TIMER: TB52 VOLTAGE: VB52 TIME: PB52 | TIMER: TB61 VOLTAGE: VB61 TIME: PB61 TIMER: TB62 VOLTAGE: VB62 TIME: PB62 | .... |
| MODE 3 | TIMER: TC01 VOLTAGE: VC01 TIME: PC01 TIMER: TC02 VOLTAGE: VC02 TIME: PC02 | TIMER: TC11 VOLTAGE: VC11 TIME: PC11 TIMER: TC12 VOLTAGE: VC12 TIME: PC12 | TIMER: TC21 VOLTAGE: VC21 TIME: PC21 TIMER: TC22 VOLTAGE: VC22 TIME: PC22 | TIMER: TC31 VOLTAGE: VC31 TIME: PC31 TIMER: TC32 VOLTAGE: VC32 TIME: PC32 | TIMER: TC41 VOLTAGE: VC41 TIME: PC41 TIMER: TC42 VOLTAGE: VC42 TIME: PC42 | TIMER: TC51 VOLTAGE: VC51 TIME: PC51 TIMER: TC52 VOLTAGE: VC52 TIME: PC52 | TIMER: TC61 VOLTAGE: VC61 TIME: PC61 TIMER: TC62 VOLTAGE: VC62 TIME: PC62 | .... |
| .... | | | | | | | | |
| 511 | 513-0 | 513-1 | 513-2 | 513-3 | 513-4 | 513-5 | 513-6 | |

212

ELECTRONIC CONTROL DEVICE, IN-VEHICLE SYSTEM, AND POWER SUPPLY CONTROL METHOD

TECHNICAL FIELD

The present invention relates to an electronic control device, an in-vehicle system, and a power supply control method and particularly, to technology effective for controlling a power supply that supplies power to a logic circuit whose circuit configuration can be changed.

BACKGROUND ART

An automatic operation is a system that can solve various social problems including reducing the number of accidents and resolving congestion and efforts towards commercialization thereof become active every year worldwide. In the automatic operation system, it is necessary to detect a vehicle, a pedestrian, a white line, and the like from a sensor input of a camera, a radar, and the like and transmit them to a driver or control a brake and a steering. Therefore, simultaneous processing of advanced recognition algorithms or a plurality of algorithms is required.

In order to respond to this demand, improving the performance of the automatic operation system by using a field-programmable gate array (FPGA) in addition to a CPU is under examination.

The FPGA is a reconfiguration circuit capable of changing a logic circuit and has a feature that processing provided in a plurality of pieces of hardware can be performed on one circuit. Of course, the present invention is not limited to the above logic circuit and a whole electronic circuit is used only when power is supplied from a power supply circuit.

Meanwhile, in an electronic apparatus such as a portable computer, by adopting a power management scheme in a predetermined operation mode and appropriately switching a function of a selected assembly in the electronic apparatus to invalidity or validity, consumption is reduced.

If the function of the assembly of the electronic apparatus is validated or invalidated, a load of the electronic apparatus changes, an output voltage from a power supply device transiently decreases and increases, and a data error, an automatic reset, or the like can be caused.

As technology for reducing the transient voltage variation, for example, there is technology for determining a load state of at least one circuit block as a function of an enable signal or a clock signal and causing the power supply device to control the output current with the output current of the power supply device as a function of the load state of at least one circuit block (for example, refer to PTL 1).

Further, as technology for smoothing an output voltage of the power supply circuit, technology for providing an output capacitor between an output terminal of the power supply and a ground terminal is widely known.

CITATION LIST

Patent Literature

PTL 1: JP 2004-336986 A

SUMMARY OF INVENTION

Technical Problem

In the automatic operation system, it is necessary to respond instantaneously to unexpected situations such as jumping of the pedestrian. Therefore, it is necessary to execute reconfiguration processing of the logic circuit in a short time. When the reconfiguration processing transits to algorithm processing, a load current of the logic circuit greatly increases in a short time. In contrast, when the algorithm processing transits to the reconfiguration processing, the load current of the logic circuit greatly decreases in a short time.

In the power supply circuit with the FPGA as the load, the output voltage transiently decreases and increases according to the rapid increase and decrease in the load current described above.

In this case, if the output voltage of the power supply circuit is out of an allowable range of the FPGA, there is a problem in that the possibility of causing the data error or the automatic reset increases. Therefore, the power supply circuit that supplies a current to the FPGA is required to have a function of supplying a constant voltage at all times even if the rapid load variation occurs.

However, in the technology disclosed in PTL 1, in order to control the circuit block, that is, to estimate the load state of the circuit block from the enable signal or the clock signal to change the load state of the circuit block, the control of the power supply circuit should be performed after the load variation. As a result, it is considered that it is difficult to sufficiently suppress the transient voltage variation.

With respect to the output capacitor to be used for smoothing the output voltage of the power supply circuit, if the load increase of the logic circuit becomes more rapid, a capacitor having a larger capacity is required and it is apprehended that a cost or an mounting area increases.

An object of the present invention is to provide technology capable of reducing a transient increase/decrease in power supplied to a logic circuit whose circuit configuration can be changed.

The above and other objects and novel features of the present invention will become apparent from the description of the present specification and the accompanying drawings.

Solution to Problem

An outline of a representative invention of the inventions disclosed in the present application is simply described as follows.

That is, a representative electronic control device has a reconfiguration circuit, a function control unit, a power supply circuit, and a power supply control unit. The reconfiguration circuit is a reconfigurable logic circuit. The function control unit determines an operation mode of the reconfiguration circuit on the basis of a mode determination signal showing an operation mode of a vehicle and controls a reconfiguration of the reconfiguration circuit on the basis of a determination result. The power supply circuit supplies a power supply voltage to the reconfiguration circuit. The power supply control unit controls the power supply circuit.

The power supply control unit controls a supply current generated by the power supply circuit before a load variation of the reconfiguration circuit, on the basis of power supply control information to be information for controlling the power supply circuit.

Particularly, power supply control information has the operation mode of the reconfiguration circuit and control information in the power supply circuit corresponding to the operation mode. Further, the power supply control unit acquires the control information corresponding to the operation mode determined by the function control unit from the power supply control information.

Furthermore, the electronic control device has a power supply control database storing the power supply control information. The power supply control unit searches for the control information corresponding to the operation mode determined by the function control unit from the power supply control information stored in the power supply control database.

Advantageous Effects of Invention

Effects obtained by a representative invention of the inventions disclosed in the present application are simply described as follows.

(1) A transient increase/decrease of an output voltage of a power supply circuit that supplies power to a reconfiguration circuit to be a logic circuit whose circuit configuration can be changed can be reduced.

(2) By the above (1), an electronic control device with high reliability can be realized.

BRIEF DESCRIPTION OF DRAWINGS

FIG. 2 is a block diagram showing an example of a configuration of an autonomous traveling control ECU included in the in-vehicle system of FIG. 1.

FIG. 3 is an explanatory diagram of a mode database included in an autonomous traveling control logic unit of FIG. 2.

FIG. 4 is an explanatory diagram of a processing item database included in the autonomous traveling control logic unit of FIG. 2.

FIG. 5 is an explanatory diagram of a power supply control database included in the autonomous traveling control logic unit of FIG. 2.

FIG. 12 is an explanatory diagram of a power supply control database included in the autonomous traveling control ECU of FIG. 10.

DESCRIPTION OF EMBODIMENTS

Figure 1:
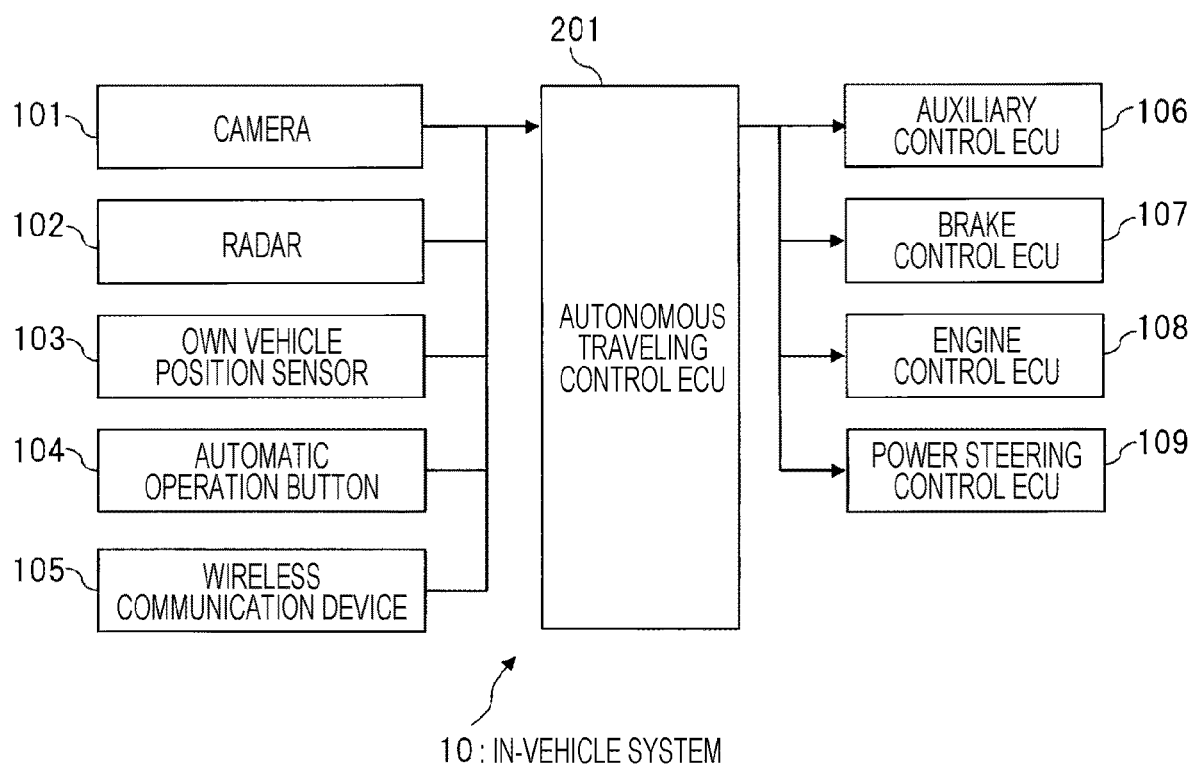
FIG. 1 is a block diagram showing an example of a configuration of an in-vehicle system according to a first embodiment.

In the following embodiments, the invention will be described in a plurality of sections or embodiments when required as a matter of convenience. However, these sections or embodiments are not irrelevant to each other unless otherwise stated and one relates to the entire or part of the other as a modification, details, or a supplementary explanation thereof.

Further, in the following embodiments, when referring to the number of elements (including the number of pieces, numerical values, amounts, ranges, and the like), the number of the elements is not limited to a specific number unless otherwise stated or except for the case in which the number is apparently limited to a specific number in principle and the number larger or smaller than the specified number is also applicable.

Furthermore, in the following embodiments, it goes without saying that components (including element steps and the like) are not always indispensable unless otherwise stated or except for the case in which the components are apparently indispensable in principle.

Similarly, in the following embodiments, when shapes of the components, a positional relation thereof, and the like are mentioned, the substantially approximate and similar shapes and the like are included therein unless otherwise stated or except for the case in which it is conceivable that they are not apparently excluded in principle. The same is applicable to the numerical values and the ranges described above.

Further, in all the drawings for explaining the embodiments, the same reference numerals are attached in principle to the same members and the repetitive description thereof is omitted. Even in a plan view, hatching may be added to facilitate understanding of the drawings.

Hereinafter, the embodiments will be described in detail.

First Embodiment

<Outline>

In an in-vehicle system 10 according to a first embodiment, an autonomous traveling control ECU 201 has a reconfiguration circuit 209 that is a reconfigurable logic circuit, a function control unit 207 that controls a reconfiguration of the reconfiguration circuit 209, a power supply circuit 211 that supplies a power supply voltage to the reconfiguration circuit 209, and a power supply control unit 206 that controls the power supply circuit 211.

Further, the autonomous traveling control ECU 201 has a power supply control database 212 in which power supply control information corresponding to each operation ID to be a plurality of pieces of processing to the reconfiguration circuit 209 from the function control unit 207 or rewriting between the plurality of pieces of processing is stored.

The power supply control unit 206 extracts the power supply control information from the power supply control database 212, on the basis of the operation ID received from the function control unit 207. Further, the power supply control unit 206 controls the power supply circuit 211 supplying a power supply voltage to the reconfiguration circuit 209, on the basis of the extracted power supply control information.

The embodiments of the present invention will be described in detail below on the basis of the drawings.

<Configuration Example of in-Vehicle System>

FIG. 1 is a block diagram showing an example of a configuration of an in-vehicle system according to the first embodiment.

The in-vehicle system 10 is, for example, a system for controlling autonomous traveling of a vehicle. As shown in FIG. 1, the in-vehicle system 10 includes a camera 101, a radar 102, an own vehicle position sensor 103, an automatic operation button 104, a wireless communication device 105, an auxiliary control ECU 106, a brake control ECU (Electronic Control Unit: Electronic Control Device) 107, an engine control ECU 108, a power steering control ECU 109, and an autonomous traveling control ECU 201.

The camera 101, the radar 102, and the own vehicle position sensor 103 are external recognition sensors that recognize an external situation of the vehicle. The camera 101 and the radar 102 are sensors for recognizing the outside or obtaining a distance to a target object.

The own vehicle position sensor 103 is a sensor for detecting an own vehicle position by a global positioning system (GPS) or the like. The automatic operation button 104 is a button for starting automatic operation control or changing an automatic operation mode.

The wireless communication device 105 that is a communication device is connected to a wireless network not shown in the drawings for updating the in-vehicle system by OTA (Over-The-Air).

The autonomous traveling control ECU 201 that is an electronic control device is an automatic operation vehicle traveling control device. The auxiliary control ECU 106 is an auxiliary automatic operation vehicle traveling control device. The brake control ECU 107 is a control device that performs brake control of the vehicle, that is, braking force control.

The engine control ECU 108 is a control device that controls an engine generating a driving force of the vehicle. The power steering control ECU 109 is a control device that controls power steering of the vehicle.

Each of the camera 101, the radar 102, the own vehicle position sensor 103, the automatic operation button 104, and the wireless communication device 105 is connected to the autonomous traveling control ECU 201. Update information including sensor information from the camera 101, the radar 102, and the own vehicle position sensor 103, an automatic operation control signal from the automatic operation button 104, and autonomous traveling control processing information from the wireless communication device 105 is transmitted to the autonomous traveling control ECU 201.

Further, the autonomous traveling control ECU 201, the auxiliary control ECU 106, the brake control ECU 107, the engine control ECU 108, and the power steering control ECU 109 are connected so as to be able to communicate with each other by a controller area network (CAN), for example.

Here, when the autonomous traveling control ECU 201 receives a request to start the automatic operation by the automatic operation button 104, the autonomous traveling control ECU 201 calculates a movement route of the vehicle on the basis of external information of the camera 101, the radar 102, the own vehicle position sensor 103, and the like.

The autonomous traveling control ECU 201 outputs control commands such as braking and driving force to the brake control ECU 107, the engine control ECU 108, and the power steering control ECU 109 so as to move the vehicle according to the above route.

The brake control ECU 107, the engine control ECU 108, and the power steering control ECU 109 receive control commands for autonomous traveling control from the autonomous traveling control ECU 201 and output operation signals to each control target such as an actuator, for example.

That is, the autonomous traveling control ECU 201 is a main control device for outputting a control command and the brake control ECU 107, the engine control ECU 108, and the power steering control ECU 109 are sub-control devices for controlling the control target according to the control command from the autonomous traveling control ECU 201.

The auxiliary control ECU 106 is an auxiliary control device for performing automatic operation control in place of the autonomous traveling control ECU 201, when the autonomous traveling control ECU 201 is abnormal.

<With Respect to Autonomous Traveling Control ECU>

FIG. 2 is a block diagram showing an example of a configuration of the autonomous traveling control ECU 201 included in the in-vehicle system 10 of FIG. 1.

The autonomous traveling control ECU 201 includes an autonomous traveling control logic unit 210 and a power supply circuit 211. Here, it is assumed that the power supply circuit 211 supplies power to the reconfiguration circuit 209. Further, in the autonomous traveling control logic unit 210, it is assumed that power is supplied to each functional block other than the reconfiguration circuit 209 by a power supply circuit not shown in the drawings.

The autonomous traveling control logic unit 210 has communication interfaces 204 and 208 (hereinafter, described as the "communication interface 204" in the case of collectively designating the communication interfaces), an information collection unit 205, a power supply control unit 206, a function control unit 207, a reconfiguration circuit 209, a mode database 202, a processing item database 203, and a power supply control database 212. Further, the function control unit 207 holds a circuit database (not shown in the drawings) to be described later.

The communication interface 204 is an interface performing communication according to a predetermined protocol, such as the CAN used in the in-vehicle system. The autonomous traveling control ECU 201 is connected to other device via the communication interface 204 and transmits and receives data.

In the present embodiment, the autonomous traveling control ECU 201 is connected to the camera 101, the radar 102, the own vehicle position sensor 103, the automatic operation button 104, and the wireless communication device 105 via the communication interface 204.

Further, the autonomous traveling control ECU 201 is connected to the auxiliary control ECU 106, the brake control ECU 107, the engine control ECU 108, and the power steering control ECU 109 via the communication interface 208.

The information collection unit 205 collects sensor information from the camera 101, the radar 102, and the own vehicle position sensor 103 input from the communication interface 204 and an automatic operation control signal from the automatic operation button 104 and periodically transfers the collected sensor information and automatic operation control signal to the function control unit 207.

If the information collection unit 205 receives update information including autonomous traveling control processing information, circuit data to be updated, and power supply control data from the wireless communication device 105, the information collection unit 205 stores the circuit data to be updated in a circuit database not shown in the drawings and updates contents of the mode database 202, the processing item database 203, and the power supply control database 212. Here, the wireless communication device 105 may be configured to be provided in the autonomous traveling control ECU 201, for example.

The information collection unit 205 is connected to each database included in the autonomous traveling control logic unit 210 via a control line not shown in the drawings. An processing example of the update information will be described later using FIG. 8.

On the basis of a mode determination signal such as the sensor information and the automatic operation control signal acquired from the information collection unit 205, the function control unit 207 refers to the mode database 202 and first determines an operation mode such as an expressway entrance mode, an automatic parking mode, or an ECU abnormality mode.

Then, processing information showing how to execute necessary operation processing in the operation mode by the reconfiguration circuit 209 is determined. Specifically, the processing information means the number of divisions of a circuit region of the reconfiguration circuit 209, circuit data for updating each circuit region, an operation time, and the like. The details of the mode database 202 and the processing item database will be described using FIGS. 3 and 4 to be described later.

Further, the function control unit 207 changes the reconfiguration circuit 209 on the basis of the processing information described above and causes the reconfiguration circuit 209 to execute processing of the corresponding operation mode. Here, a dotted line arrow between the function control unit 207 and the reconfiguration circuit 209 shows that the function control unit 207 transfers circuit data for reconfiguring a circuit from a circuit database not shown in the drawings and a completion notification thereof. Further, a solid line arrow between the function control unit 207 and the reconfiguration circuit 209 shows that an execution instruction or execution data of processing and an execution result thereof are transferred.

Furthermore, the function control unit 207 outputs a control command such as braking and driving force via the communication interface 208, on the basis of a result of the processing executed by the reconfiguration circuit 209.

The reconfiguration circuit 209 is a circuit for executing predetermined processing on data and is constituted by hardware capable of changing a circuit configuration such as the FPGA, for example. The circuit configuration of the reconfiguration circuit 209 is changed by the function control unit 207 according to the processing information described above and the reconfiguration circuit 209 executes predetermined processing.

The power supply control unit 206 acquires mode information and an internal timer value managed by the function control unit 207 from the function control unit 207. Here, the internal timer value is a value of a counter incremented by an internal clock.

The power supply control unit 206 performs synchronization by updating the internal timer value of the power supply control unit 206, on the basis of the acquired internal timer value. In the power supply control database 212, information on a schedule of power supply control such as a control signal and timing to the power supply circuit 211 is stored.

The power supply control unit 206 performs power supply control so as to increase or decrease the current supplied by the power supply circuit 211, on the basis of the power supply control database 212 and the internal timer value.

The details of the power supply control database 212 will be described later using FIG. 3. Further, the details of the power supply control processing will be described later using FIGS. 4 and 5. Here, the power supply circuit 211 has been described as a dedicated power supply circuit of the reconfiguration circuit 209. However, the power supply circuit 211 may be a power supply circuit that supplies power to the entire autonomous traveling control logic unit 210.

The respective function units of the autonomous traveling control logic unit 210, that is, the information collection unit 205, the function control unit 207, and the power supply control unit 206 are constituted by a program executed by the autonomous traveling control logic unit 210 or a logic circuit for performing a predetermined operation, for example, the FPGA. For the sake of functional safety of the automatic operation, each function unit of the autonomous traveling control logic unit 210 may be constituted by a processor having a plurality of cores adopting a lock step system.

Further, the autonomous traveling control logic unit 210 may be physically configured on one electronic control device or may be logically or physically configured on a plurality of electronic control devices. The program of each function unit described above may operate on a separate thread on the same electronic control device or may operate on a virtual electronic control device constructed on resources of a plurality of electronic control devices.

<Various Databases>

FIG. 3 is an explanatory diagram of the mode database 202 included in the autonomous traveling control logic unit 210 of FIG. 2.

The mode database 202 is referred to by the function control unit 207 of FIG. 2 and is obtained by associating information acquired from the information collection unit 205 with an operation mode to be selected. The mode database 202 has a mode selection condition 301 for selecting an operation mode on the basis of the information acquired from the information collection unit 205 and an operation mode 302 selected by the mode selection condition 301.

For example, as an example of an application to the automatic operation, in the mode selection condition 301, the case where the expressway entrance has been determined on the basis of the parameter information of the external recognition sensors such as the camera 101, the radar 102, and the own vehicle position sensor 103 shown in FIG. 1 may be set as a first mode selection condition and in the operation mode 302, a first operation mode may be determined as a mode 1.

Further, in the mode selection condition 301, the case of receiving a control signal for automatic parking by the automatic operation button 104 of FIG. 1 may be set as a second mode selection condition and in the operation mode 302, a second operation mode may be determined as a mode 2.

Similarly, in the mode selection condition 301, the case of detecting abnormality of the ECU as failure detection information may be set as a third mode selection condition and in the operation mode 302, a third operation mode may be determined as a mode 3.

FIG. 4 is an explanatory diagram of the processing item database 203 included in the autonomous traveling control logic unit 210 of FIG. 2.

The processing item database 203 is referred to by the function control unit 207 of FIG. 2 and associates the operation mode 302 with processing contents of the corresponding mode. The processing item database 203 is obtained by associating a processing method 402 and processing information 1 (403-1) to processing information 3 (403-3) (in the case of collectively designating the processing information, they are described as the "processing information 403") for each operation mode 401.

The processing method 402 is obtained by designating order of one or more processing to be executed, a reconfiguration procedure of a circuit, and the like. The processing information 403 is processing information designated by the processing method 402.

For example, when the operation mode 401 is the mode 1, providing one circuit region on the reconfiguration circuit 209 of FIG. 2 and sequentially executing processing of the processing information 1 (403-1), processing of the processing information 2 (403-2), and processing of the processing information 3 (403-3) are held as the processing method 402. In addition, circuit data A1 for executing first processing of the mode 1 and a processing time T11 thereof may be held as the processing information 1 (403-1).

Similarly, circuit data A2 for executing second processing of the mode 1 and a processing time T12 thereof may be held as the processing information 2 (403-2) and circuit data A3 for executing third processing of the mode 1 and a processing time T13 thereof may be held as the processing information 3 (403-3).

As an example of an application to the automatic operation, the first processing of the mode 1 may be set as sensing processing, the second processing of the mode 1 may be set as behavior prediction processing of a vehicle or a pedestrian, and the third processing of the mode 1 may be set as movement route calculation processing of the vehicle.

Further, when the operation mode 401 is the mode 2, dividing the circuit region into two parts, sequentially executing processing of the processing information 1 (403-1) and the processing information 2 (403-2) in one region, and executing processing of the processing information 3 (403-3) in the other region may be held as the processing method 402.

Similarly to when the operation mode 401 is the mode 1, circuit data B1 to B3 for executing the first to third processing of the mode 2, respectively, and processing times T21 to T23 thereof may be held as the processing information 403.

As an example of an application to the automatic operation, any one of the first to third processing of the mode 2 may be set as empty parking space search processing. Further, when the operation mode 401 is the mode 3, dividing the circuit region into three parts, executing respective processing of the processing information 1 (403-1), the processing information 2 (403-2), and the processing information 3 (403-3) in parallel may be held as the processing method 402.

Similarly to when the operation mode 401 is the mode 1, circuit data C1 to C3 for executing the first to third processing of the mode 3, respectively, and processing times T31 to T33 thereof may be held as the processing information 403.

As an example of an application to the automatic operation, any one of the first to third processing of the mode 3 may be set as trajectory securing processing to stop safely. Here, the example in which three pieces of information (processing information 1 (403-1) to processing information 3 (403-3)) are held as the processing information 403 has been shown. However, four or more pieces of information may be held.

FIG. 5 is an explanatory diagram of the power supply control database 212 included in the autonomous traveling control logic unit 210 of FIG. 2.

In the power supply control database 212, information on a schedule of power supply control such as a control signal and timing to the power supply circuit 211 is stored.

The details will be described below. The power supply control database 212 is referred to by the power supply control unit 206 of FIG. 2 and associates an operation mode 501 and control information 0 (503-0) to control information 6 (503-6) (in the case of collectively designating the power supply control information, they are described as "power supply control information 503") to be power supply control contents of the operation mode 501.

For example, when the operation mode 501 is the mode 1, a timer value TA0, a load current value IA0, and a processing time PA0 may be held as the control information 0 (503-0). The timer value TA0 is a timer value that considers timing to start writing a connection circuit to an interface with the function control unit 207 of FIG. 2 to the reconfiguration circuit 209. The load current value IA0 is a load current value of the reconfiguration circuit 209 during writing.

Similarly, a timer value TA1 considering timing to start writing the circuit data A1 for executing the first processing of the mode 1 to the reconfiguration circuit 209, a load current value IA1 of the reconfiguration circuit 209 during writing, and a processing time PA1 may be held as the control information 1 (503-1).

As the control information 2 (503-2), a timer value TA2 considering timing to start executing the first processing of the mode 1, a load current value IA2 of the reconfiguration circuit 209 during executing of the first processing, and a processing time PA2 may be held.

As the control information 3 (503-3), a timer value TA3 considering timing to start writing the circuit data A2 for executing the second processing of the mode 1 to the reconfiguration circuit 209, a load current value IA3 of the reconfiguration circuit 209 during writing, and a processing time PA3 may be held.

As the control information 4 (503-4), a timer value TA4 considering timing to start executing the second processing of the mode 1, a load current value IA4 of the reconfiguration circuit 209 during executing of the second processing, and a processing time PA4 may be held.

As the control information 5 (503-5), a timer value TA5 considering timing to start writing the circuit data A3 for executing the third processing of the mode 1 to the reconfiguration circuit 209, a load current value IA5 of the reconfiguration circuit 209 during writing, and a processing time PA5 may be held.

As the control information 6 (503-6), a timer value TA6 considering timing to start executing the third processing of the mode 1, a load current value IA6 of the reconfiguration circuit 209 during executing of the third processing, and a processing time PA6 may be held.

Each load current value may hold a temporal average value of a load current, for example. Here, as described above, it is assumed that the power supply circuit 211 of FIG. 2 supplies power to only the reconfiguration circuit 209. However, the power supply circuit 211 may be configured to supply power to the entire autonomous traveling control logic unit 210. In this case, a load current value of the entire autonomous traveling control logic unit 210 is stored in the power supply control database 212.

Further, the timer value is a value of a counter incremented by an internal clock, for example, is managed by the function control unit 207 of FIG. 2, and is used for synchronization with the power supply control unit 206. The timer value is adjusted so that the supply current of the power supply circuit 211 increases or decreases before the load current of the reconfiguration circuit 209 varies, in consideration of a signal delay between the function control unit 207 and the power supply control unit 206 or a control delay until the supply current of the power supply circuit 211 increases or decreases from starting of the power supply control processing by the power supply control unit 206.

Before operating as the in-vehicle system, the power supply control database 212 may store each numerical value on the basis of an actual measurement value or a simulation value, or the power supply control unit 206 may create it on the basis of each information of the processing item database 203 acquired from the function control unit 207 and store it. Further, the power supply control information 503 may include a voltage value, a current value, or a control code for controlling the supply current of the power supply circuit 211.

<Power Supply Control Processing>

Next, power supply control processing of the power supply control unit 206 will be described using FIGS. 6 and 7.

Figure 6:
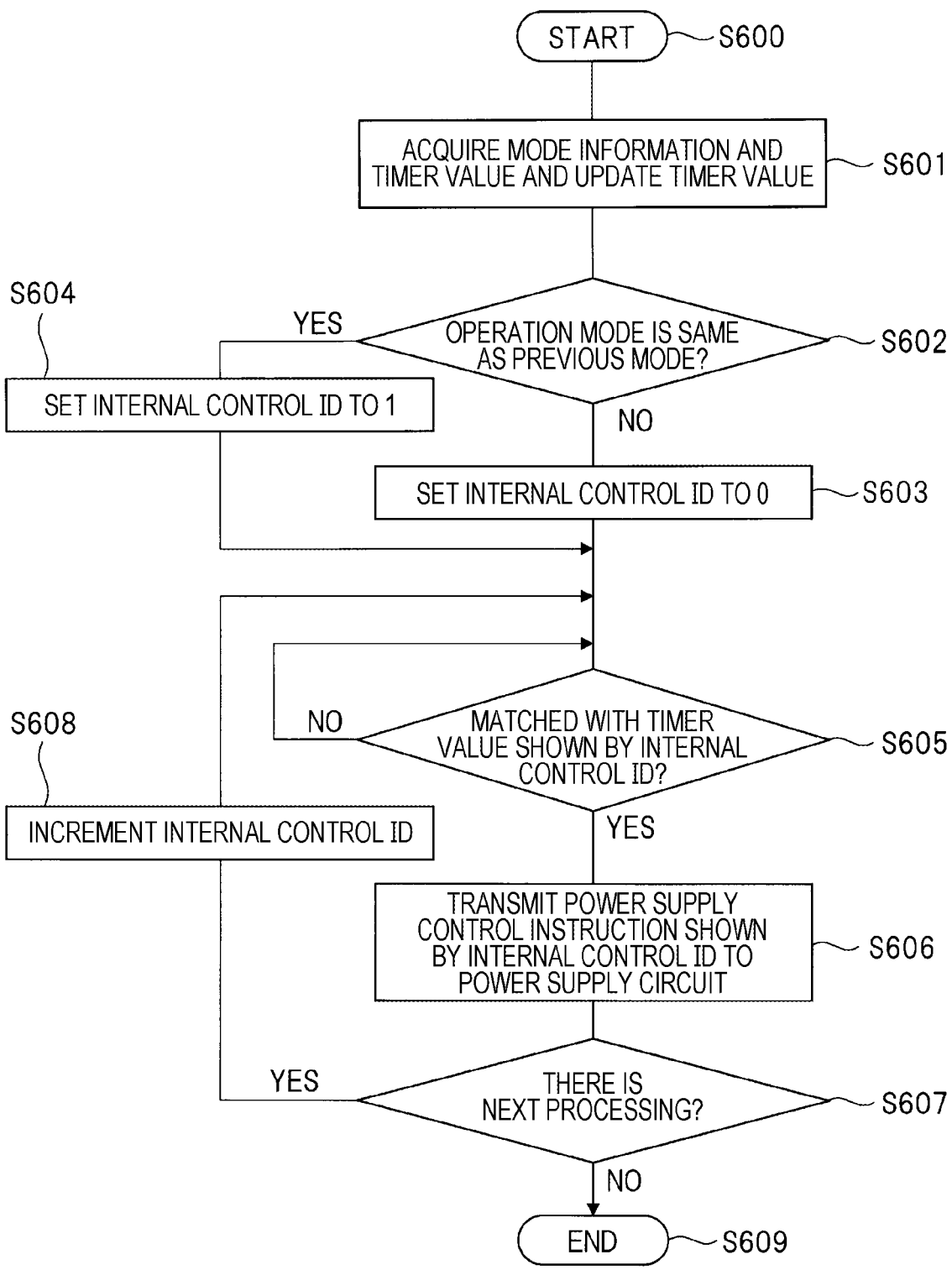
FIG. 6 is a flowchart showing an example of power supply control processing in a power supply control unit of FIG. 2.

FIG. 6 is a flowchart showing an example of power supply control processing in the power supply control unit 206 of FIG. 2.

Here, an example in which the power supply control database 212 is previously created and stored and the power supply control unit 206 manages processing order by using an internal control ID is shown.

The internal control ID indicates each of numbers of the control information 0 to 6 of the power supply control information 503 in FIG. 5. Further, description is given on the assumption that each of the function control unit 207 and the power supply control unit 206 of FIG. 2 includes an internal timer.

First, when the power supply control unit 206 starts power supply control processing (step S600), before a reconfiguration circuit operation starts, the power supply control unit 206 acquires a mode information and a timer value from the function control unit 207 and updates an internal timer value of the power supply control unit 206 (step S601).

After the processing of step S601, the power supply control unit 206 determines whether or not a value of an operation mode is the same as a previous mode value (step S602). In the processing of step S602, when it is determined that the value of the operation mode is different from the previous mode value (NO), the power supply control unit 206 sets the internal control ID to 0 (step S603).

On the other hand, when it is determined that the value of the operation mode is the same as the previous mode value (YES), the power supply control unit 206 sets the internal control ID to 1 (step S604). This is to determine whether or not processing for writing the connection circuit to the interface with the function control unit 207 to the reconfiguration circuit 209 is necessary according to whether or not the operation mode is different from the previous mode. Of course, ID information of the connection circuit may be obtained from the function control unit 207 and it may be determined whether or not the ID information is the same as previous ID information.

After the processing of step S603 or the processing of step S604, the power supply control unit 206 refers to the power supply control database 212 and maintains a waiting state until the timer value shown by the internal control ID and the internal timer value of the power supply control unit 206 are matched (Step S605).

When it is determined by the processing of step S605 that the timer values are matched (YES), a load current value and a processing time shown by the internal control ID are transmitted as a power supply control instruction to the power supply circuit 211 (step S606). The power supply circuit 211 supplies a reference current value until the power supply circuit 211 receives the power supply control instruction. If the power supply circuit 211 receives the power supply control instruction, the power supply circuit 211 increases or decreases the supply current to become the load current value shown by the internal control ID and when the processing time shown by the internal control ID ends, the power supply circuit 211 supplies the reference current value again.

The reference current value may be set by considering a leak current when a supply target is only the reconfiguration circuit 209. In the case of supplying power to the entire autonomous traveling control logic unit 210, the reference current value may be set by considering a load current other than the reconfiguration circuit 209.

Then, the power supply control unit 206 determines whether or not there is next processing (step S607). The power supply control unit 206 can determine whether or not there is the next processing, from the power supply control database 212 of FIG. 5.

When it is determined in step S607 that there is the next processing (YES), the power supply control unit 206 increments an internal processing ID (step S608) and returns to the processing of step S605 to prepare for next processing.

When it is determined by the processing of step S607 that there is not the next processing (NO), the power supply control unit 206 ends the power supply control processing (step S609).

Figure 7:
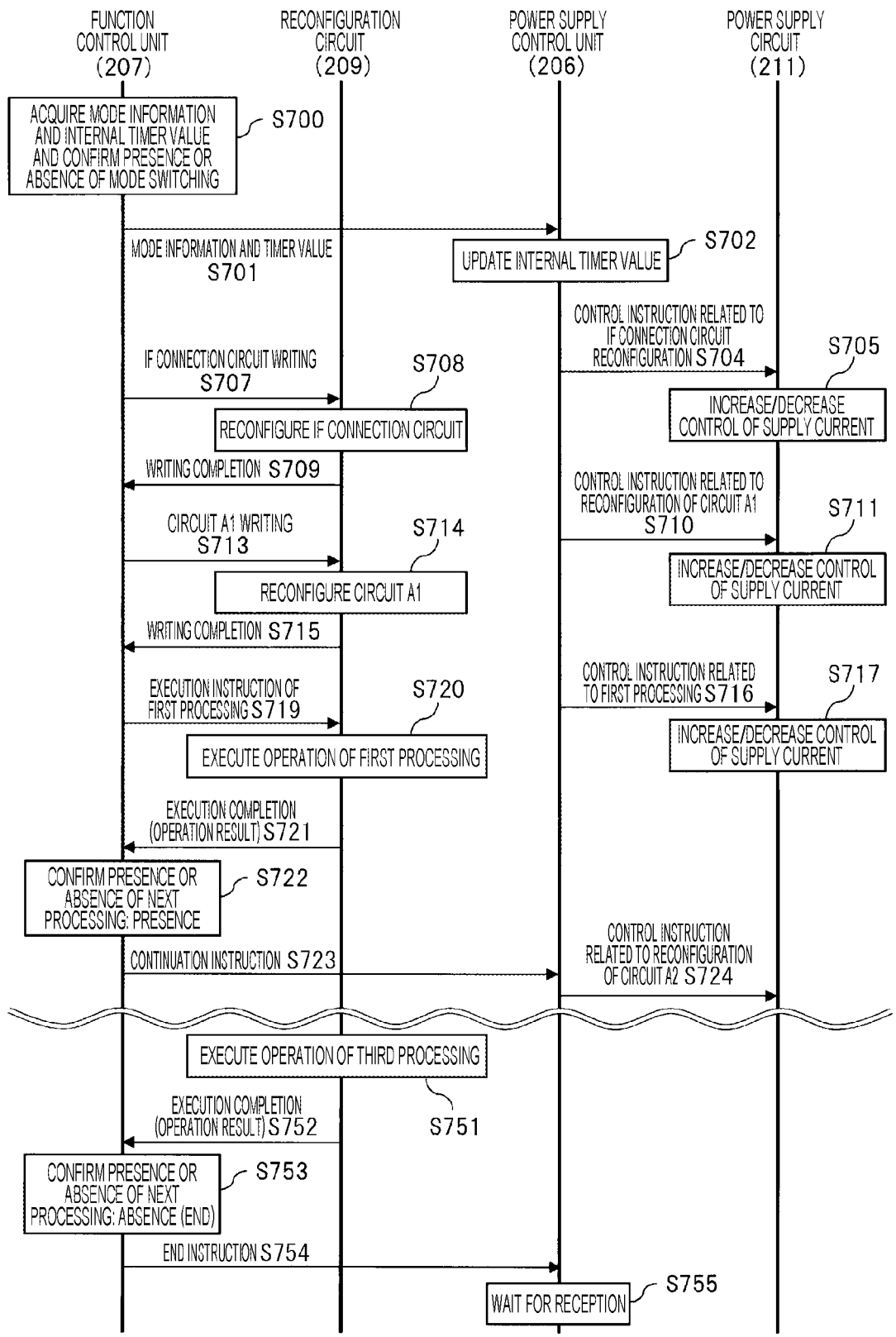
FIG. 7 is a sequence diagram showing an example of power supply control processing in the power supply control unit of FIG. 2.

FIG. 7 is a sequence diagram showing an example of the power supply control processing in the power supply control unit 206 of FIG. 2.

In FIG. 7, the case where the operation mode 501 of the power supply control database 212 described in FIG. 5 is the mode 1 will be described as an example.

Here, it is assumed that the power supply control database 212 is previously created and stored.

First, the function control unit 207 acquires the mode information from the mode database 202 and checks whether or not the mode is switched. Furthermore, the internal timer value managed by the function control unit 207 is acquired (step S700). Here, an example in which the mode is switched is shown.

Next, the function control unit 207 sends the mode information and the timer value to the power supply control unit 206 (step S701). The power supply control unit 206 updates the internal timer value of the power supply control unit 206 on the basis of the timer value (step S702).

By referring to the control information 0 (503-0) related to the reconfiguration of the connection circuit to the interface with the function control unit 207 held in the power supply control database 212, if the timer value and the internal timer value of the power supply control unit 206 are matched, the load current value and the processing time are transmitted as a power supply control instruction to the power supply circuit 211 (step S704).

The power supply circuit 211 that has received the power supply control instruction increases or decreases the supply current to the reconfiguration circuit 209 so that the supply current becomes the load current value shown by the internal control ID from the reference current value and returns the supply current to the reference current value again when the processing time ends (step S705).

The function control unit 207 writes the connection circuit data to the interface with the function control unit 207 to the reconfiguration circuit 209 only slightly behind the start of the current control in the processing of step S705, for example, about 1 millisecond or less (step S707).

The reconfiguration circuit 209 reconfigures the interface connection circuit (step S708) and notifies the function control unit 207 of a completion of writing (step S709). In addition, the power supply control unit 206 refers to the control information 1 (503-1) related to the reconfiguration of the circuit data A1 held in the power supply control database 212. If the timer value and the internal timer value of the power supply control unit 206 are matched, the power supply control unit 206 transmits the load current value and the processing time as a power supply control instruction to the power supply circuit 211 (step S710).

The power supply circuit 211 that has received the power supply control instruction increases or decreases the supply current to the reconfiguration circuit 209 so that the supply current becomes the load current value shown by the internal control ID from the reference current value and returns the supply current to the reference current value again when the processing time ends (step S711).

The function control unit 207 writes data of the circuit A1 to the reconfiguration circuit 209 slightly behind the start of the current control by the processing of S711 (step S713). The reconfiguration circuit 209 reconfigures the circuit A1 (step S714) and notifies the function control unit 207 of a completion of writing (step S715).

Next, the power supply control unit 206 refers to the control information 2 (503-2) related to the first processing, held in the power supply control database 212. If the timer value and the internal timer value of the power supply control unit 206 are matched, the power supply control unit 206 transmits the load current value and the processing time as a power supply control instruction to the power supply circuit 211 (step S716).

The power supply circuit 211 that has received the power supply control instruction increases or decreases the supply current to the reconfiguration circuit 209 so that the supply current becomes the load current value shown by the internal control ID from the reference current value and returns the supply current to the reference current value again when the processing time shown by the internal control ID ends (step S717).

The function control unit 207 notifies the reconfiguration circuit 209 of an execution instruction of the first processing slightly behind the start of the current control in the processing of step S717 (step S719). The reconfiguration circuit 209 executes an operation of the first processing (step S720) and notifies the function control unit 207 of an operation result, in other words, an execution completion together with a process result (step S721). Here, the function control unit 207 may hold the operation result of the first processing and may use it for an operation of subsequent processing.

In addition, the function control unit 207 confirms presence or absence of next processing (step S722). Here, an example in which the operation mode 501 is the mode 1 and there is the second processing to be next processing is shown.

The function control unit 207 transmits a continuation instruction of the power supply control to the power supply control unit 206 (step S723). The power supply control unit 206 refers to the control information 3 (503-3) related to the reconfiguration of the circuit data A2, held in the power supply control database 212. If the timer value and the internal timer value of the power supply control unit 206 are matched, the power supply control unit 206 transmits the load current value and the processing time as a power supply control instruction to the power supply circuit 211 (step S724).

Hereinafter, similarly to the processing of steps S705 to S722 described above, the circuit data A2 and the second processing using the circuit data A2 and the circuit data A3 and the third processing using the circuit data A3 are performed.

Next, the function control unit 207 confirms presence or absence of next processing (step S753). Here, since the operation mode 501 is the mode 1, there is no next processing, an end instruction is sent to the power supply control unit 206 (step S754), the power supply control unit 206 receives the end instruction and waits for reception (step S755), so that the sequence of the power supply control processing ends. In the above description, each of the function control unit 207 and the power supply control unit 206 includes the internal timer. However, the function control unit 207 and the power supply control unit 206 may include a common internal timer.

In the automatic operation, it is required to repeatedly perform various processing such as sensing processing, distance calculation processing, behavior prediction processing of a vehicle and a pedestrian, and movement route calculation processing of the vehicle. For this reason, the autonomous traveling control logic unit 210 periodically performs processing based on collected sensor information, automatic operation control signals, and the like. Therefore, as described above, the power supply control unit 206 does not necessarily have to obtain each information every period from the function control unit 207.

In the case where a failure or the like occurs in the power supply control unit 206 and the power supply control of the power supply circuit 211 cannot be performed normally, for example, a control delay increases during operation, an alarm signal may be sent to the function control unit 207 and a delay may be given to a start time of the reconfiguration processing or the operation processing of the reconfiguration circuit 209.

In the case where the power supply circuit 211 also performs power supply other than the reconfiguration circuit 209, for a block of other autonomous traveling control logic unit, an operation may be performed avoiding a section where a load variation of the reconfiguration circuit 209 occurs. Alternatively, the operation of the same section may be caused to be redundant.

<Extension of Operation Mode>

Figure 8:
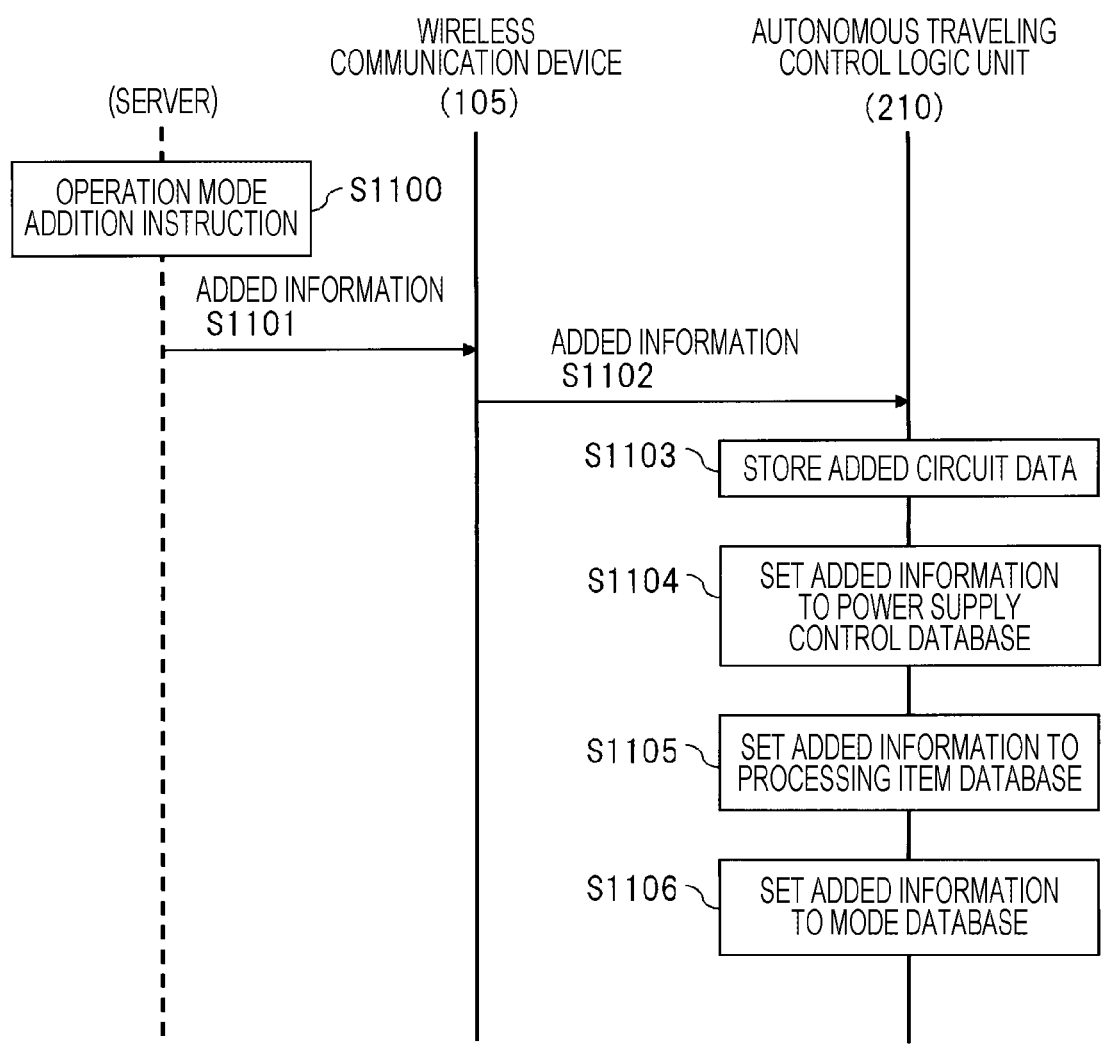
FIG. 8 is a sequence diagram showing an example of operation mode extension in the in-vehicle system of FIG. 1.

FIG. 8 is a sequence diagram showing an example of operation mode extension in the in-vehicle system 10 of FIG. 1.

In FIG. 8, an example of adding an operation mode of an automatic operation via a wireless network by OTA (Over-The-Air) from a server on a cloud or the like is shown.

First, when an addition instruction of an operation mode is set to the server (step S1100), information on an operation mode to be added is transferred to the wireless communication device 105 of the in-vehicle system (S1101). The information on the operation mode is, for example, contents of the mode database 202, the processing item database 203, and the power supply control database 212 and circuit data of the operation mode to be added.

Next, the wireless communication device 105 transfers the received added information to the autonomous traveling control logic unit 210 (step S1102). In addition, the autonomous traveling control logic unit 210 stores the circuit data in the circuit database (step S1103).

Further, the autonomous traveling control logic unit 210 sets the operation mode 501 and the control information 503 to be added to the power supply control database 212 (step S1104). Further, the autonomous traveling control logic unit 210 sets the operation mode 401, the processing method 402, and the processing information 403 to be added to the processing item database 203 (step S1105).

Then, the autonomous traveling control logic unit 210 adds the selection condition 301 and the operation mode 302 of the operation mode to be added to the mode database 202 (S1106) and completes the processing.

As a result, it is possible to flexibly reconfigure the circuit according to a period interval of period processing or an operation load (performance, delay, or the like) required for the operation mode of the automatic operation. Furthermore, when a new operation mode of the automatic operation is added, it is possible to additionally introduce, into the autonomous traveling control unit, a circuit data or a processing method to be used in the operation mode to be added without affecting the operation mode being used.

By the above, the power supply control unit 206 can obtain information on a schedule of the reconfiguration and the operation from the function control unit 207 controlling the reconfiguration and the operation of the reconfiguration circuit 209 and can control the power supply circuit 211 so as to increase or decrease the supply current to the reconfiguration circuit 209 before the load variation due to the reconfiguration and operation of the reconfiguration circuit 209.

As a result, it is possible to reduce the transient increase/decrease of the output voltage of the power supply circuit 211 and to provide the autonomous traveling control ECU 201 with high reliability at a low cost and a small area.

<Another Example of Autonomous Traveling Control ECU>

Figure 9:
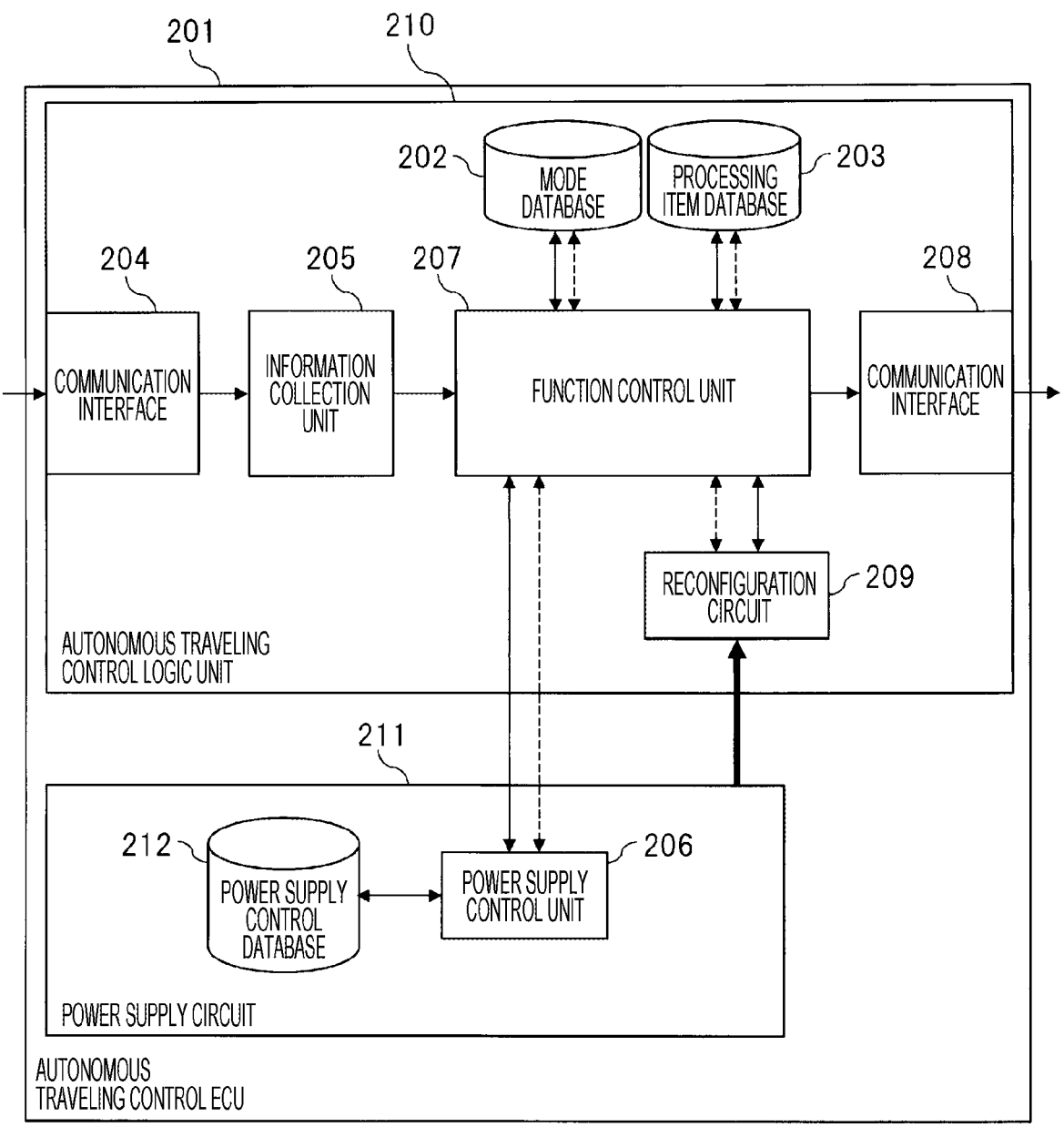
FIG. 9 is a block diagram showing another example of the autonomous traveling control ECU of FIG. 2.

FIG. 9 is a block diagram showing another example of the autonomous traveling control ECU 201 of FIG. 2.

As shown in FIG. 9, the autonomous traveling control ECU 201 includes the autonomous traveling control logic unit 210 and the power supply circuit 211. In the following description, it is assumed that the power supply circuit 211 performs power supply to the reconfiguration circuit 209 and power supply to the autonomous traveling control logic unit 210 other than the reconfiguration circuit 209 is performed by a power supply circuit not shown in the drawings.

The autonomous traveling control ECU 201 of FIG. 9 is largely different from the autonomous traveling control ECU 201 of FIG. 2 in that the power supply control unit 206 and the power supply control database 212 are included in the power supply circuit 211, not the autonomous traveling control logic unit 210, and basic processing and control may be considered to be the same as the above description using FIG. 2.

As described above, by functionally separating the main logic unit of the automatic traveling control and the power supply circuit 211, it can be advantageous in terms of functional safety. As a result, it is possible to provide the autonomous traveling control ECU 201 with higher reliability at a low cost and a small area while reducing the transient increase/decrease of the output voltage of the power supply circuit 211.

Second Embodiment

Hereinafter, an autonomous traveling control ECU according to a second embodiment will be described using FIGS. 10 to 12.

<Autonomous Traveling Control ECU>

Figure 10:
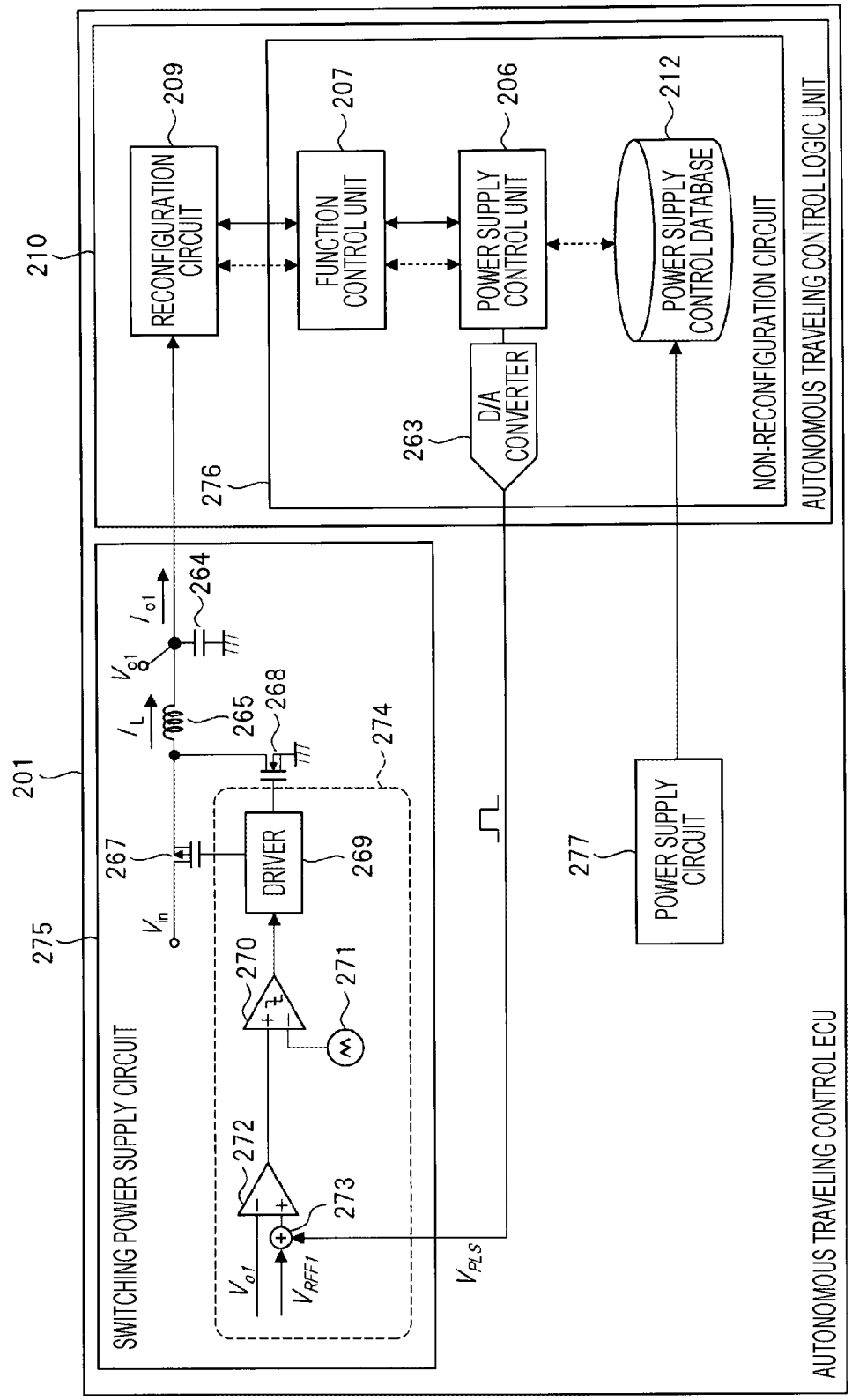
FIG. 10 is an explanatory diagram showing an example of a configuration of an autonomous traveling control ECU according to a second embodiment.

FIG. 10 is an explanatory diagram showing an example of a configuration of an autonomous traveling control ECU 201 according to the second embodiment.

As shown in FIG. 10, the autonomous traveling control ECU 201 includes an autonomous traveling control logic unit 210, a switching power supply circuit 275, and a power supply circuit 277. The autonomous traveling control logic unit 210 has a reconfiguration circuit 209 and a non-reconfiguration circuit 276.

The non-reconfiguration circuit 276 has a function control unit 207, a power supply control unit 206, a power supply control database 212, and a digital/analog (D/A) converter 263.

The function control unit 207 holds a circuit database not shown in the drawings. The switching power supply circuit 275 supplies power to the reconfiguration circuit 209 and the power supply circuit 277 supplies power to the non-reconfiguration circuit 276.

Further, although not shown in the drawings, the autonomous traveling control ECU 201 has a plurality of communication interfaces, an information collection unit, a mode database, and a processing item database, similarly to FIG. 1 of the first embodiment.

The power supply control unit 206 acquires mode information and an internal timer value managed by the function control unit 207 from the function control unit 207. Further, the power supply control unit 206 performs synchronization by updating the internal timer value of the power supply control unit 206, on the basis of the acquired internal timer value.

In the power supply control database 212, information on a schedule of power supply control such as a control signal and timing to the switching power supply circuit 275 is stored. The power supply control unit 206 performs power supply control so as to increase or decrease a supply current of the switching power supply circuit 275, on the basis of the power supply control database 212 and the internal timer value.

Here, in order to explain that analog control is performed, a power supply control signal is converted from a digital value to an analog value using the D/A converter 263 and is transmitted to the switching power supply circuit 275. The details of the power supply control database 212 will be described later using FIG. 12.

The switching power supply circuit 275 includes an inductor current control unit 274, switches 267 and 268, an inductor 265, and a capacitor 264. Here, a step-down switching power supply circuit using a pulse width modulation (PWM) control method will be described as an example.

The inductor current control unit 274 increases or decreases an inductor current IL flowing through the inductor 265 by performing ON/OFF control of the switches 267 and 268. Since an output voltage Vo1 generated by a supply current Io1 flowing through the reconfiguration circuit 209 has a large ripple due to a variation of the inductor current IL, the output voltage is smoothed by the capacitor 264 and becomes a voltage close to a direct current.

The inductor current control unit 274 includes a switch driver 269, a comparator 270, a triangular wave generator 271, an error detector 272, and an adder 273.

First, a power supply control signal $V_{PLS}=0$ sent from the power supply control unit 206 through the D/A converter 263 will be described.

A reference voltage $V_{REF1}$ and the observed output voltage $V_{o1}$ are input to the error detector 272 and a difference between both the input voltages is output from the error detector 272. The difference is input to the comparator 270 together with an output of the triangular wave generator 271.

As a result, a PWM signal according to the above difference is output from the comparator 270. The switch driver 269 performs ON/OFF control of the switches 267 and 268 according to the PWM signal and adjusts the inductor current IL. The switching power supply circuit 275 operates to constantly maintain the output voltage $V_{o1}$ by such a feedback system and steps down an input voltage $V_{in}$.

However, due to the feedback control, when there is a rapid load variation in the reconfiguration circuit 209, following of the output voltage $V_{o1}$ is disabled and a transient increase or decrease occurs at timing of the load variation.

Figure 11:
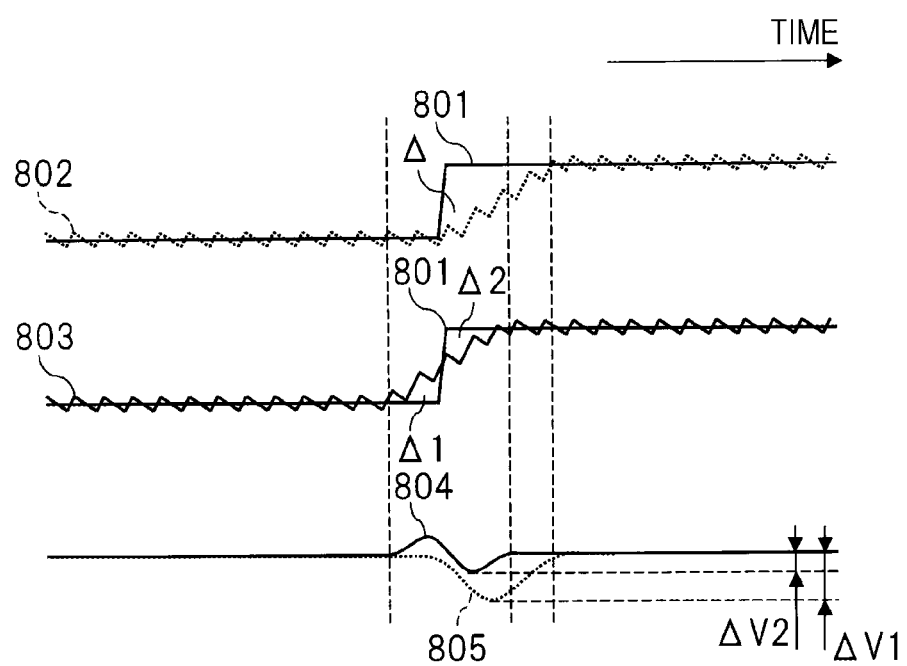
FIG. 11 is a schematic diagram of an inductor current waveform and an output voltage change to show an effect of power supply control by a power supply control unit of FIG. 10.

FIG. 11 is a schematic diagram of an inductor current waveform and an output voltage change to show an effect of power supply control by the power supply control unit 206 of FIG. 10.

As shown in the drawings, since following of an inductor current 802 is delayed at timing at which a load current 801 rapidly changes, in an output voltage 805, a large voltage drop of ΔV1 occurs in accordance with an insufficient charge amount (corresponding to an area A in FIG. 11).

The power supply control signal $V_{PLS}$ is a voltage pulse signal to be added to $V_{REF1}$ by the adder 273 before the timing of the load variation. By inputting the power supply control signal $V_{PLS}$ to the inductor current control unit 274, it is possible to control an increase or decrease in the inductor current $I_L$ before the timing at which the load current 801 rapidly changes.

For example, areas of Δ1 and Δ2 can be matched like an inductor current 803 of FIG. 11. At this time, an output voltage 804 becomes a transient variation of ΔV2 and the voltage transient variation can be reduced as compared with the case of the power supply control signal $V_{PLS}$=0.

<Power Supply Control Database>

FIG. 12 is an explanatory diagram of the power supply control database 212 included in the autonomous traveling control ECU 201 of FIG. 10.

In the power supply control database 212, information on a schedule of power supply control such as a control signal and timing to the switching power supply circuit 275 of FIG. 10 is stored.

The details will be described below. The power supply control database 212 is referred to by the power supply control unit 206 and associates an operation mode 511 and control information 0 (513-0) to control information 6 (513-6) (in the case of collectively designating the power supply control information, they are described as "power supply control information 513") to be power supply control contents of the corresponding mode.

For example, when an operation mode 511 is a mode 1, the control information 0 (513-0) may hold a timer value TA01, a voltage value VA01 of a power supply control signal, a pulse width time PA01, a timer value TA02, a voltage value VA02 of a power supply control signal, and a pulse width time PA02.

The timer value TA01 is a timer value that considers timing to start writing a connection circuit to an interface with the function control unit 207 to the reconfiguration circuit 209. The timer value TA02 is a timer value that considers timing to end writing the connection circuit to the reconfiguration circuit 209.

Similarly, a timer value TA11 considering timing to start writing circuit data A1 for executing first processing of the mode 1 to the reconfiguration circuit 209, a voltage value VA11 of a power supply control signal, and a pulse width time PA11 and a timer value TA12 considering timing to end writing the circuit data A1 to the reconfiguration circuit 209, a voltage value VA12 of a power supply control signal, and a pulse width time PA12 may be held as the control information 1 (513-1).

Similarly, a timer value TA21 considering timing to start executing the first processing of the mode 1, a voltage value VA21 of a power supply control signal, and a pulse width time PA21 and a timer value TA22 considering timing to end executing the first processing, a voltage value VA22 of a power supply control signal, and a pulse width time PA22 may be held as the control information 2 (513-2).

Similarly, a timer value TA31 considering timing to start writing circuit data A2 for executing second processing of the mode 1 to the reconfiguration circuit 209, a voltage value VA31 of a power supply control signal, and a pulse width time PA31 and a timer value TA32 considering timing to end writing the circuit data A2 to the reconfiguration circuit 209, a voltage value VA32 of a power supply control signal, and a pulse width time PA32 may be held as the control information 3 (513-3).

Similarly, a timer value TA41 considering timing to start executing the second processing of the mode 1, a voltage value VA41 of a power supply control signal, and a pulse width time PA41 and a timer value TA42 considering timing to end executing the second processing, a voltage value VA42 of a power supply control signal, and a pulse width time PA42 may be held as the control information 4 (513-4).

Similarly, a timer value TA51 considering timing to start writing circuit data A3 for executing third processing of the mode 1 to the reconfiguration circuit 209, a voltage value VA51 of a power supply control signal, and a pulse width time PA51 and a timer value TA52 considering timing to end writing the circuit data A3 to the reconfiguration circuit 209, a voltage value VA52 of a power supply control signal, and a pulse width time PA52 may be held as the control information 5 (513-5).

Similarly, a timer value TA61 considering timing to start executing the third processing of the mode 1, a voltage value VA61 of a power supply control signal, and a pulse width time PA61 and a timer value TA62 considering timing to end executing the third processing, a voltage value VA62 of a power supply control signal, and a pulse width time PA62 may be held as the control information 6 (513-6).

Further, the timer value is a value of a counter incremented by an internal clock, is managed by the function control unit 207, and is used for synchronization with the power supply control unit 206. The timer value is adjusted so that the supply current of the switching power supply circuit 275 increases or decreases before the load current of the reconfiguration circuit 209 varies, in consideration of a signal delay between the function control unit 207 and the power supply control unit 206 or a control delay until the supply current of the switching power supply circuit 275 increases or decreases from starting of the power supply control processing by the power supply control unit 206.

Before operating as the in-vehicle system, the power supply control database 212 may store each numerical value on the basis of an actual measurement value or a simulation value, or the power supply control unit 206 may create it on the basis of each information of the processing item database acquired from the function control unit 207 and store it.

Here, an example of adding the voltage pulse signal to the reference voltage $V_{REF1}$ as the power supply control signal has been described. However, it may be added to an output voltage value to be input to the error detector 272. Further, a power supply control signal for temporarily increasing a response speed of a feedback loop of the switching power supply circuit 275 may be used to correspond to a rapid change in the load current.

As the power supply control signal, a gain of the comparator 270 may be increased or a frequency of the triangular wave generator 271 may be increased. Further, instead of controlling the switching power supply circuit by the PWM control method, a hysteresis control method may be used.

Further, an observation unit (not shown in the drawings) for monitoring the power supply voltage supplied to the reconfiguration circuit 209 may be provided and the power supply control unit 206 may compare a monitored voltage value with a control voltage to be a setting voltage initially set in the power supply control database 212 and update the power supply control database 212 according to an error between both the voltages.

As the observation unit described above, for example, a voltage may be divided by a high resistance and observed by the power supply control unit 206 through an operational amplifier and an analog/digital (A/D) converter.

For updating the power supply control database 212, a value of (control voltage value−observed voltage value) may be added to the control voltage value of the power supply control database 212. Of course, a correction function with (control voltage value−observed voltage value) as an input value may be previously incorporated in the power supply control unit 206 and the power supply control database 212 may be updated on the basis of an output value thereof.

<Modification of Switching Power Supply Circuit>

Figure 13:
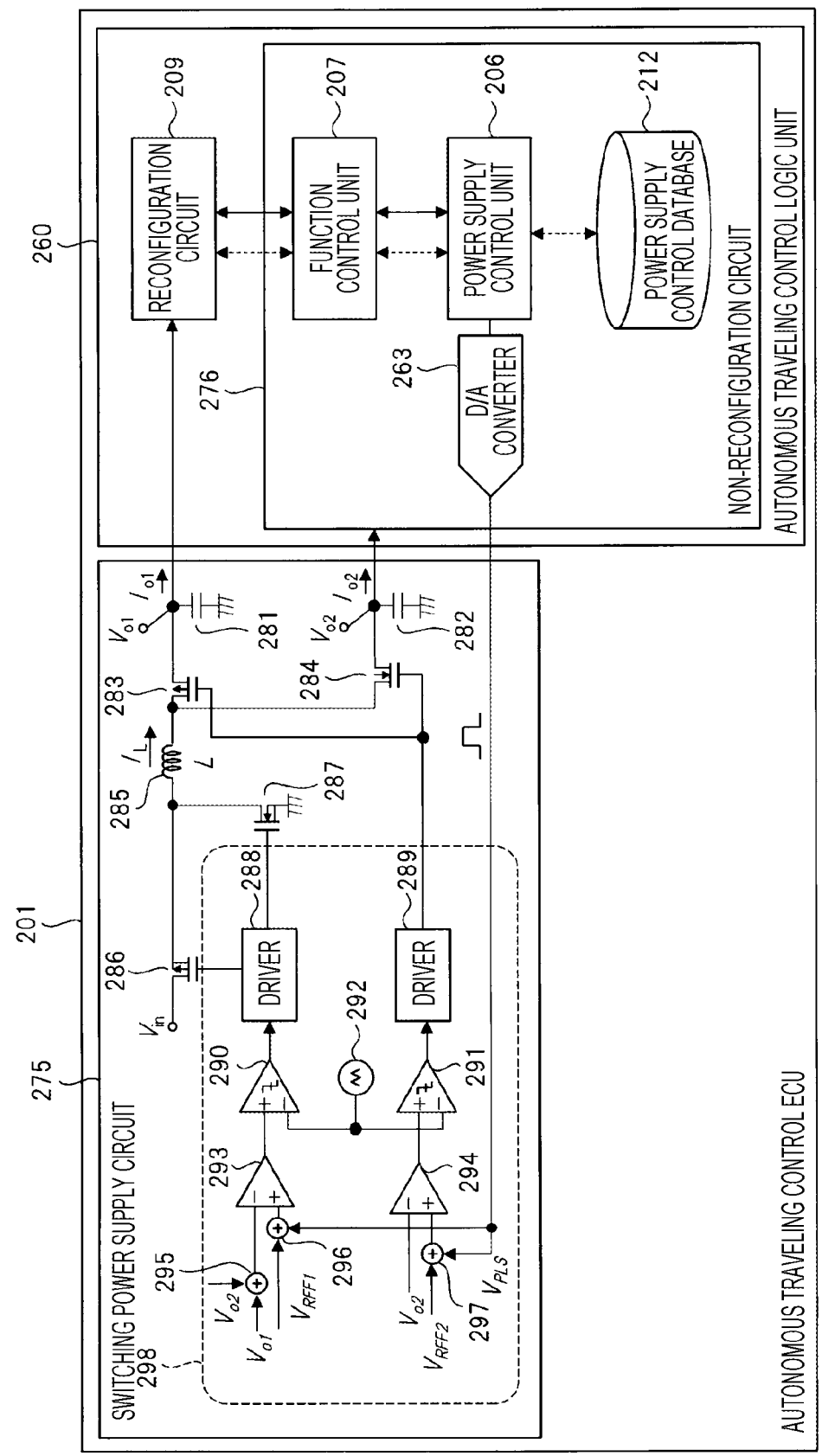
FIG. 13 is an explanatory diagram showing another configuration example of the autonomous traveling control ECU of FIG. 10.

FIG. 13 is an explanatory diagram showing another configuration example of the autonomous traveling control ECU 201 of FIG. 10.

The autonomous traveling control ECU 201 of FIG. 13 is different from the autonomous traveling control ECU 201 of FIG. 10 in a configuration of the switching power supply circuit 275.

The switching power supply circuit 275 shown in FIG. 13 is a single inductor multi output (SIMO) power supply circuit of one inductor and two outputs and supplies power to the reconfiguration circuit 209 and the non-reconfiguration circuit 276. Since the SIMO power supply circuit has a plurality of outputs in one inductor, it is technology that can contribute to cost reduction and area reduction.

As shown in the drawings, the switching power supply circuit 275 includes an inductor current control unit 298, switches 283, 284, 286, and 287, an inductor 285, and capacitors 281 and 282.

Here, a step-down switching power supply circuit using a pulse width modulation (PWM) control method will be described as an example. The inductor current control unit 298 increases or decreases an inductor current $I_L$ flowing through the inductor 285 by performing ON/OFF control of the switches 286 and 287.

Further, the output destination of the power supply voltage is changed to the reconfiguration circuit 209 or the non-reconfiguration circuit 276 by performing ON/OFF control of the switches 283 and 284. The switches 283 and 284 and the inductor current control unit 298 constitute an output switching unit.

Since an output voltage Vo1 generated by a supply current Io1 flowing through the reconfiguration circuit 209 has a large ripple due to a variation of the inductor current IL, the output voltage is smoothed by using the capacitor 281 and becomes a voltage close to a direct current.

Likewise, an output voltage Vo2 generated by a supply current Io2 flowing through the non-reconfiguration circuit 276 is smoothed by using the capacitor 282. The inductor current control unit 298 includes switch drivers 288 and 289, comparators 290 and 291, a triangular wave generator 292, error detectors 293 and 294, and adders 295, 296, and 297.

Likewise, an output voltage Vo2 generated by an output current Io2 flowing through the non-reconfiguration circuit 276 is smoothed by using the capacitor 282. The inductor current control unit 298 includes switch drivers 288 and 289, comparators 290 and 291, a triangular wave generator 292, error detectors 293 and 294, and adders 295, 296, and 297.

The power supply control signal VPLS sent from the power supply control unit 206 through the D/A converter 263 is added to the reference voltage VREF1 by the adder 296. The added output voltage Vo1 and output voltage Vo2 are added by the adder 295. The added voltages are input to the error detector 293, and a difference between the voltages is output from the error detector 293.

The difference is input to the comparator 290 together with the output of the triangular wave output unit 292. As a result, a PWM signal according to the above difference is output from the comparator 290. The switch driver 288 performs ON/OFF control of the switches 286 and 287 according to the PWM signal and adjusts the inductor current IL.

On the other hand, the power supply control signal $V_{PLS}$ is also added to a reference voltage $V_{REF2}$ by the adder 296 and input to the error detector 294 together with the observed output voltage $V_{o2}$, and a difference between them is output from the error detector 294.

The difference is input to the comparator 291 together with the output of the triangular wave output unit 292. As a result, a PWM signal according to the above difference is output from the comparator 291. The switch driver 289 performs ON/OFF control of the switches 283 and 284 according to the PWM signal and adjusts the output destination.

The switching power supply circuit 275 operates to constantly maintain the output voltage $V_{o1}$ and the output voltage $V_{o2}$ by such a feedback system and steps down the input voltage $V_{in}$.

However, due to the feedback control, when there is a rapid load variation in the reconfiguration circuit 209, following of the output voltage $V_{o1}$ is disabled and a transient increase or decrease occurs at timing of the load variation. This transient voltage variation can also appear in the output voltage $V_{o2}$ as inter-output interference.

The power supply control signal $V_{PLS}$ is a voltage pulse signal to be added to the reference voltages $V_{REF1}$ and $V_{REF2}$ before the timing of the load variation and is previously stored in the control information database 212 or the like, for example.

By inputting the power supply control signal $V_{PLS}$ to the inductor current control unit 298, it is possible to control an increase or a decrease in the inductor current IL before the timing at which the load current rapidly changes and it is possible to reduce the voltage transient variation of the output voltage.

As described above, it is possible to control the power supply circuit so that the supply current to the reconfiguration circuit 209 is increased or decreased before the load variation due to the reconfiguration and the operation of the reconfiguration circuit 209, by using a simple analog circuit.

As a result, it is possible to reduce the transient increase/decrease of the output voltage of the switching power supply circuit 275 and it is possible to provide the autonomous traveling control ECU 201 with high reliability at a low cost and a small area.

Although the invention made by the present inventors has been specifically described on the basis of the embodiments, it goes without saying that the present invention is not limited to the embodiments and various changes can be made without departing from the gist thereof.

The present invention is not limited to the embodiments described above and various modifications are included. For example, the embodiments are described in detail to facilitate the description of the present invention and are not limited to including all of the described configurations.

Further, a part of the configurations of the certain embodiment can be replaced by the configurations of other embodiments or the configurations of other embodiments can be added to the configurations of the certain embodiment. Further, for a part of the configurations of the individual embodiments, addition of other configurations, configuration removal, and configuration replacement can be performed.

Further, a part or all of the individual configurations, functions, processing units, and processing mechanisms may be designed by integrated circuits and may be realized by hardware. Further, the individual configurations and functions may be realized by software by analyzing programs for realizing the functions by a processor and executing the programs by the processor. Information such as the programs, the tables, and the files for realizing the individual functions may be stored in a recording device such as a memory, a hard disk, and a solid state drive (SSD) or a recording medium such as an IC card, an SD card, and a DVD.

Further, only control lines or information lines necessary for explanation are shown and the control lines or information lines do not mean all control lines or information lines necessary for a product. In actuality, almost all configurations may be mutually connected.

REFERENCE SIGNS LIST 10 in-vehicle system
101 camera
102 radar
103 own vehicle position sensor
104 automatic operation button
105 wireless communication device
106 auxiliary control ECU
107 brake control ECU
108 engine control ECU
109 power steering control ECU
201 autonomous traveling control ECU
202 mode database
203 processing item database
204 communication interface
205 information collection unit
206 power supply control unit
207 function control unit
208 communication interface
209 reconfiguration circuit
210 autonomous traveling control logic unit
211 power supply circuit
212 power supply control database
212 power supply circuit
276 non-reconfiguration circuit

The invention claimed is:

1. An electronic control device, comprising:
a reconfiguration circuit which is a reconfigurable logic circuit;
wherein the electronic control device is configured to:
determine an operation mode of the reconfiguration circuit, on the basis of a mode determination signal input from outside the electronic control device indicative of a traveling mode of a vehicle;
control a reconfiguration of the reconfiguration circuit on the basis of a determination result;
control a power supply circuit which supplies a power supply voltage to the reconfiguration circuit;
control a supply current generated by the power supply circuit before a load variation of the reconfiguration circuit, on the basis of power supply control information for controlling the power supply circuit;
monitor the power supply voltage supplied to the reconfiguration circuit from a switching power supply circuit;
compare the monitored power supply voltage and a setting voltage previously set in the power supply control information; and
update the power supply control information as stored in a power supply control database, according to a difference between the monitored power supply voltage and the setting voltage.

2. The electronic control device according to claim 1, wherein the power supply circuit supplies the power supply voltage to a logic circuit other than the reconfiguration circuit included in the electronic control device.

3. The electronic control device according to claim 1, wherein the power supply control information has an operation mode of the reconfiguration circuit and reconfiguration control information for the power supply circuit corresponding to the operation mode, and
the reconfiguration control information corresponding to the operation mode is determined from the power supply control information.

4. The electronic control device according to claim 3, wherein the reconfiguration control information corresponding to the operation mode determined from the power supply control information is stored in the power supply control database.

5. The electronic control device according to claim 4, wherein the power supply circuit is a switching power supply circuit, and
the reconfiguration control information stored in the power supply control database has a control instruction for controlling an increase/decrease of an inductor current in the switching power supply circuit.

6. The electronic control device according to claim 4, further comprising:
a communication device which is connected to a communication network; and
an information collection unit which collects update information for the power supply control information from the communication network through the communication device and updates the power supply control information stored in the power supply control database.

7. The electronic control device according to claim 5, wherein the switching power supply circuit switches an output destination of the generated power supply voltage to the reconfiguration circuit or another logic circuit, and
switches the output destination of the power supply voltage, on the basis of a power supply control signal.

8. An in-vehicle system having an autonomous traveling control device for controlling autonomous traveling of a vehicle,
wherein the autonomous traveling control device has a reconfiguration circuit which is a reconfigurable logic circuit, and the autonomous traveling control device is configured to:
determine an operation mode of the reconfiguration circuit on the basis of a mode determination signal indicative of a traveling mode when the vehicle travels autonomously;
control a reconfiguration of the reconfiguration circuit on the basis of a determination result;
supply a power supply voltage to the reconfiguration circuit;

control the power supply circuit; control a supply current generated by the power supply circuit before a load variation of the reconfiguration circuit, on the basis of power supply control information for controlling the power supply circuit;

monitor the power supply voltage supplied to the reconfiguration circuit from a switching power supply circuit;

compare the monitored power supply voltage and a setting voltage previously set in the power supply control information; and update the power supply control information stored in a power supply control database, according to a difference between the monitored power supply voltage and the setting voltage.

9. The in-vehicle system according to claim 8, wherein the power supply control information has an operation mode of the reconfiguration circuit and reconfiguration control information for the power supply circuit corresponding to the operation mode, and the reconfiguration control information corresponding to the operation mode is determined from the power supply control information.

10. The in-vehicle system according to claim 9, wherein the reconfiguration control information corresponding to the operation mode determined from the power supply control information is stored in the power supply control database.

11. The in-vehicle system according to claim 10, further comprising:

a communication device which is connected to a communication network; and an information collection unit which collects update information for the power supply control information from the communication network through the communication device and updates the power supply control information stored in the power supply control database.

12. A power supply control method in an electronic control device having a reconfiguration circuit which is a reconfigurable logic circuit, comprising:

determining an operation mode of the reconfiguration circuit on the basis of a mode determination signal indicative of a traveling mode of a vehicle;

controlling a reconfiguration of the reconfiguration circuit on the basis of a determination result;

supplying a power supply voltage to the reconfiguration circuit;

controlling the power supply circuit, by causing the power supply control unit to control a supply current generated by the power supply circuit before a load variation of the reconfiguration circuit, on the basis of power supply control information for controlling the power supply circuit;

monitoring the power supply voltage supplied to the reconfiguration circuit from a switching power supply circuit;

comparing the monitored power supply voltage and a setting voltage previously set in the power supply control information; and updating the power supply control information stored in a power supply control database, according to a difference between the monitored power supply voltage and the setting voltage.

13. The power supply control method according to claim 12, wherein the power supply control information has an operation mode of the reconfiguration circuit and reconfiguration control information for the power supply circuit corresponding to the operation mode, and the step of controlling the supply current acquires the control information corresponding to the operation mode from the power supply control information.

14. The power supply control method according to claim 13, wherein the reconfiguration control information corresponding to the operation mode is acquired by searching the power supply control database where the power supply control information is stored.

* * * * *